(12) United States Patent
Numata

(10) Patent No.: US 12,353,571 B2
(45) Date of Patent: Jul. 8, 2025

(54) STORAGE DEVICE

(71) Applicant: KIOXIA CORPORATION, Tokyo (JP)

(72) Inventor: Kenichi Numata, Tokyo (JP)

(73) Assignee: Kioxia Corporation, Tokyo (JP)

( * ) Notice: Subject to any disclaimer, the term of this patent is extended or adjusted under 35 U.S.C. 154(b) by 848 days.

(21) Appl. No.: 17/008,271

(22) Filed: Aug. 31, 2020

(65) Prior Publication Data
US 2021/0141910 A1 May 13, 2021

(30) Foreign Application Priority Data
Nov. 12, 2019 (JP) .................. 2019-204690

(51) Int. Cl.
G06F 21/60 (2013.01)
G06F 21/40 (2013.01)
G06F 21/62 (2013.01)

(52) U.S. Cl.
CPC ............ G06F 21/604 (2013.01); G06F 21/40 (2013.01); G06F 21/6218 (2013.01)

(58) Field of Classification Search
CPC .... G06F 21/604; G06F 21/40; G06F 21/6218; G06F 21/31; G06F 21/78
See application file for complete search history.

(56) References Cited

U.S. PATENT DOCUMENTS

2015/0143134 A1 5/2015 Hashimoto
2015/0370727 A1* 12/2015 Hashimoto ............. G06F 21/64
711/163
2016/0070493 A1* 3/2016 Oh ......................... G06F 3/0679
711/104
2016/0139850 A1 5/2016 Ejiri et al.
2018/0191721 A1 7/2018 Freyensee et al.
2019/0087113 A1 3/2019 Isozaki et al.
2019/0227938 A1 7/2019 Gopalakrishnan et al.
2019/0303563 A1* 10/2019 Powell .................... G06F 21/53

FOREIGN PATENT DOCUMENTS

CN 102981980 A 3/2013
CN 105989299 A 10/2016

OTHER PUBLICATIONS

First Office Action mailed Dec. 27, 2023 in Chinese Patent Application No. 202010617401.7 with English translation, 24 pages.
Trusted Computing Group, Incorporated., "TCG Storage Security Subsystem Class: Opal," Specification Version 2.01, Revision 1.00, Aug. 5, 2015, 80 pages.

* cited by examiner

Primary Examiner — Huan V Doan
(74) Attorney, Agent, or Firm — Kim & Stewart LLP

(57) ABSTRACT

A storage device includes a storage and a controller. The storage includes a plurality of sections. The controller executes control of the storage. The control includes writing data to the storage and reading data from the storage, in response to a command from a host. The controller includes a security control unit that applies a data protection processing method compliant with a first specification or a second specification, to protect data in the storage. The security control unit applies a first data protection processing method compliant with the first specification to a first section of the plurality of sections and a second data protection processing method compliant with the second specification to a second section of the plurality of sections.

12 Claims, 7 Drawing Sheets

| METHOD | PARAMETER |
|---|---|
| Activate | Namespace ID |
| | SSC |
| | Range NUMBER |

STORAGE DEVICE

CROSS-REFERENCE TO RELATED APPLICATION(S)

This application is based upon and claims the benefit of priority from Japanese Patent Application No. 2019-204690, filed Nov. 12, 2019, the entire contents of which are incorporated herein by reference.

FIELD

Embodiments described herein relate generally to a storage device.

BACKGROUND

In recent years, an interest in preventing data leakage has increased. For example, a storage device having a data protection function, which prevents data from being stolen by an unauthorized user, by encrypting the data and storing the encrypted data has become widely used.

It is assumed that storage devices such as a solid state drive (SSD) and a hard disk drive (HDD) are broadly classified into two use cases, mainly used for a personal computer (PC) of an end user and mainly used for a server of a company. Storage Work Group (SWG) of Trusted Computing Group (TCG) has formulated a plurality of specifications, known as Security Subsystem Classes (SSCs), for different use cases, including Opal for the PC use case and Enterprise for the server use case.

In NVM Express (NVMe®), which is one of several interface standards for a storage device, a procedure for setting a section referred to as a namespace in a storage is defined. Configurable Namespace Locking (CNL) is a TCG standard for implementing data protection in units of a namespace when a plurality of namespaces are set, for example.

However, in CNL, only one SSC can be applied to one storage device and different SSCs cannot be applied for different namespaces even when a plurality of namespaces are set. For example, Opal cannot be applied to one namespace set in the storage device while Enterprise is applied to another namespace set in the storage device. For CNL, there is a problem that the specification is too complex and it is difficult to ensure independence of the namespaces.

DETAILED DESCRIPTION

Embodiments of the present disclosure provide a storage device in which convenience of the data protection function is improved.

In general, according to one embodiment, a storage device includes a storage and a controller. The storage includes a plurality of sections. The controller executes control of the storage. The control includes writing data to the storage and reading data from the storage, in response to a command from a host. The controller includes a security control unit that applies a data protection processing method compliant with a first specification or a second specification, to protect data in the storage. The security control unit applies a first data protection processing method compliant with the first specification to a first section of the plurality of sections and a second data protection processing method compliant with the second specification to a second section of the plurality of sections.

Hereinafter, embodiments will be described with reference to drawings.

First Embodiment

First, a first embodiment will be described.

Figure 1:
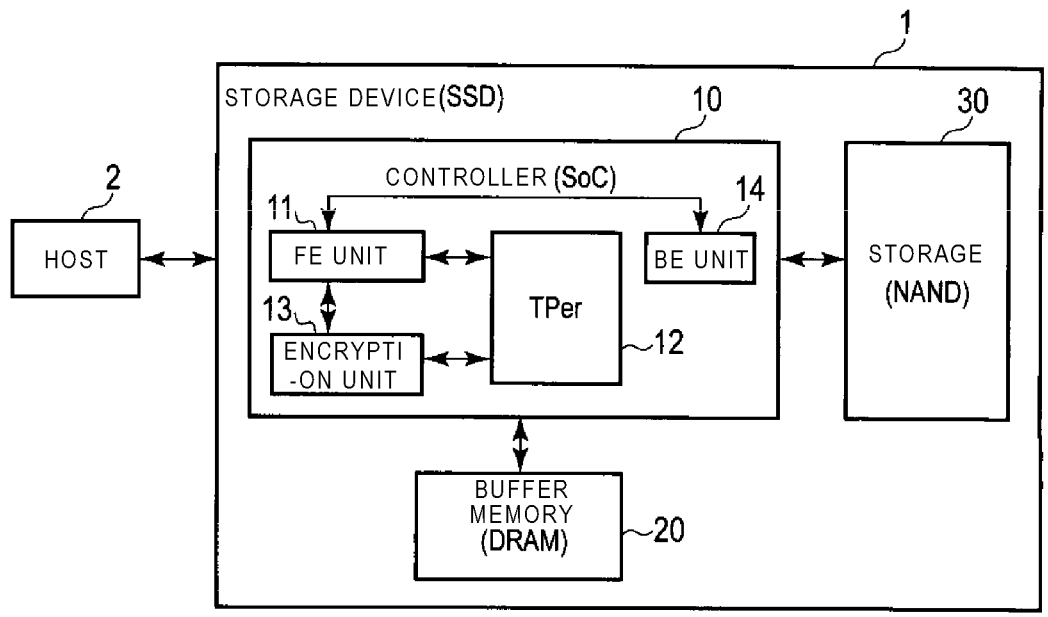
FIG. 1 is a diagram showing a configuration example of a storage device according to a first embodiment.

FIG. 1 is a diagram showing a configuration example of a storage device 1 according to the present embodiment. Here, it is assumed that the storage device 1 is implemented as a solid state drive (SSD) having a data protection function such as encryption. The storage device 1 is not limited to the SSD, and may be implemented as a hard disk drive (HDD) or the like. As the data protection function, not only encryption but also setting for prohibiting writing and setting for prohibiting reading is possible. The data protection function is also referred to as a security function.

As shown in FIG. 1, the storage device 1 includes a controller 10 configured as a system-on-a-chip (SoC), a buffer memory 20 which is, for example, a dynamic random access memory (DRAM), and a storage 30 which is, for example, a NAND flash memory. The storage device 1 can be connected to a host 2, which is a PC or a server, via an interface such as PCIe®.

The controller 10 receives a write command or a read command from the host 2, and writes data transferred from the host 2 into the storage 30, or reads data requested by the host 2 from the storage 30, using the buffer memory 20 as a temporary storage area for data. That is, the controller 10 controls the storage 30 based on a command from the host 2.

When writing data into the storage 30, the controller 10 can encrypt the data using an encryption key, and when reading encrypted data from the storage 30, the encrypted data can be decrypted using the same encryption key used for encryption. The controller 10 can collectively invalidate data in the storage 30 by updating the encryption key. The update of the encryption key is executed, for example, by generating a random number and replacing the value of the encryption key with the value of the generated random number. The controller 10 executes such protection of data in accordance with various specifications formulated as an SSC by TCG SWG such as Opal or Enterprise.

Here, it is assumed that the storage device 1 and the host 2 conform to NVMe, which is one of various types of interfaces that can be applied to the storage device 1 and the host 2. The host 2 that communicates with the storage device 1 compliant with NVMe can request the storage device 1 to set a section referred to as a namespace in the storage 30, more specifically, in an area provided by the storage device 1 to the host 2 as a user area from the entire storage area of the storage 30. Also, in the storage device 1 of the present embodiment, an SSC can be applied on a namespace basis, and this point will be described in detail below.

As shown in FIG. 1, the controller 10 includes the following circuits: a front end (FE) unit 11, a trusted peripheral (TPer) 12, an encryption unit 13, and a back end (BE) unit 14. Here, operation of the controller 10 related to the data protection function will be mainly described. The TPer 12 plays a main role in the data protection function and may be implemented in hardware (e.g., FPGA or logic circuits) or as software running on a processor (not shown). The encryption unit 13 operates under control of the TPer 12. The FE unit 11 is a circuit module responsible for the entire processing related to the host 2 and located in an upstream stage of the TPer 12. The BE unit 14 is a circuit module responsible for the entire processing related to the storage 30 and located in a downstream stage of the TPer 12. The TPer 12 is a circuit module for implementing the entire security service related to the data protection function regulated by the TCG SWG.

When a write command is transmitted from the host 2, the FE unit 11 receives the write command and passes write data together with information indicating a write destination to the TPer 12. The TPer 12 determines whether data is writable to a designated write destination. If the data is writable, the TPer 12 instructs the encryption unit 13 to encrypt the write data using the encryption key corresponding to the write destination. When the data is not writable, the TPer 12 notifies the FE unit 11 of this fact, and an error is returned from the FE unit 11 to the host 2 as a response to the write command.

The encryption unit 13 encrypts the write data according to the instruction of the TPer 12, and passes the encrypted write data to the FE unit 11. The FE unit 11 passes the encrypted write data to the BE unit 14 via the buffer memory 20, and instructs writing to the storage 30. When the writing to the storage 30 via the BE unit 14 is completed, the FE unit 11 returns write success to the host 2 as a response to the write command.

When a read command is transmitted from the host 2, the FE unit 11 receives the read command and passes information indicating a read destination and the like to the TPer 12. The TPer 12 determines whether the data is readable from the designated read destination. If the data is readable, the TPer 12 notifies the FE unit 11 of this fact. When the data is not readable, the TPer 12 notifies the FE unit 11 of this fact, and an error is returned from the FE unit 11 to the host 2 as a response to the read command.

The FE unit 11 passes information indicating the read destination to the BE unit 14, and instructs reading of data from the storage 30. The FE unit 11 passes encrypted read data received from the BE unit 14 to the encryption unit 13 via the buffer memory 20. The TPer 12 instructs the encryption unit 13 to decrypt the encrypted read data passed from the FE unit 11 using the encryption key corresponding to the read destination. The FE unit 11 receives the decrypted read data from the encryption unit 13. The FE unit 11 transmits the decrypted read data to the host 2 as a response to the read command.

Figure 2:
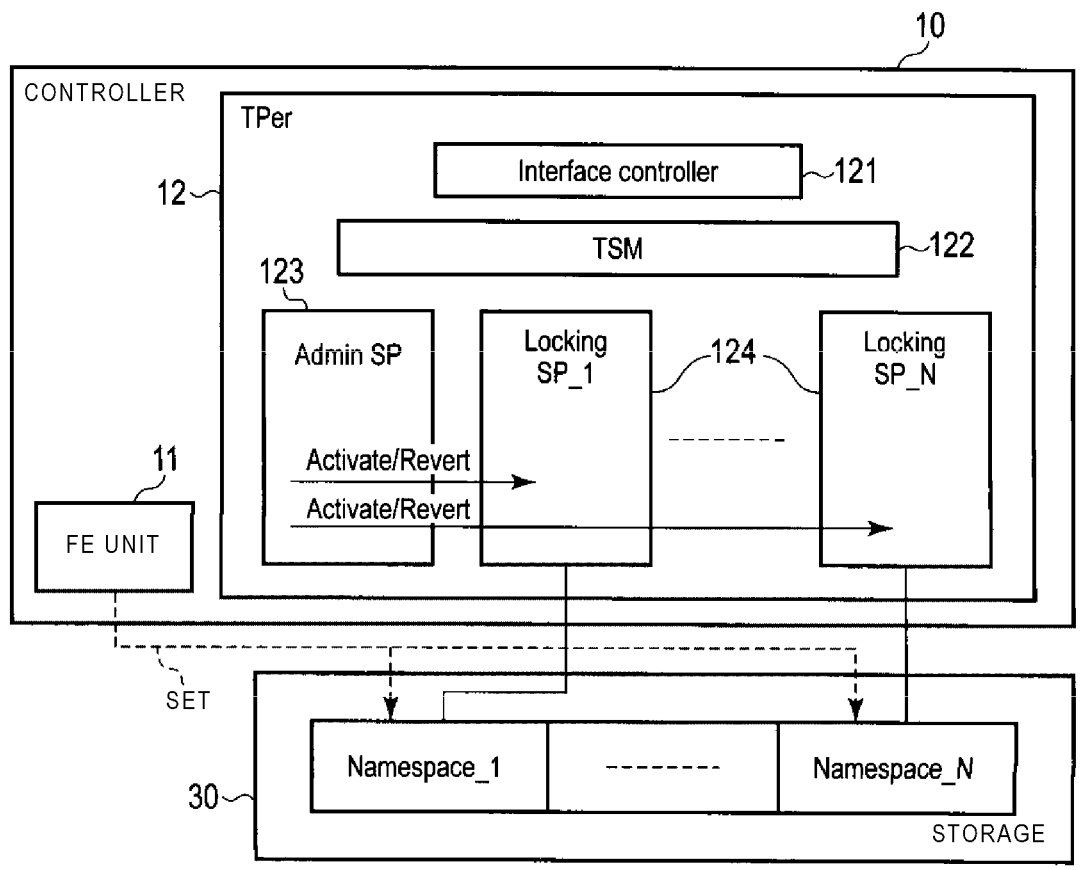
FIG. 2 is a diagram showing a configuration example of a trusted peripheral in a controller of the storage device according to the first embodiment.

FIG. 2 is a diagram showing a configuration example of the TPer 12.

As shown in FIG. 2, the TPer 12 includes an interface controller 121, a TPer session manager (TSM) 122, two types of security providers (SP), that is, an Admin SP 123 and a Locking SP 124.

The interface controller 121 executes processing (e.g., abstraction) of communication between the TPer 12 and the host 2 to allow the communication to not depend on a specific interface, in other words, to implement the communication independently of a specific interface. The interface controller 121 supports various interfaces regulated in TCG SIIS. In addition to the NVMe assumed to be used in the present embodiment, examples of the various interfaces include small computer system interface (SCSI), AT Attachment (ATA), Embedded Multi Media Card (eMMC), and the like.

The TSM 122 manages a session that is a logical connection between the host 2 and the SPs (i.e., Admin SP 123 and Locking SPs 124).

Each SP (Admin SP 123 and Locking SPs 124) is a complex of templates (and forms a functional block). The Admin SP 123 is configured with a base template for common functions of all SPs and an admin template for an admin function which will be described later. The Locking SPs 124 include a base template and locking templates for various locking functions including a "Range" function, and a master boot record (MBR) shadowing function which will be described later.

In CNL, one Locking SP corresponds to all namespaces to which the data protection function is applied. On the other hand, in the storage device 1 of the present embodiment, multiple Locking SPs 124 are provided so that the number of Locking SPs 124 is the same as the number of namespaces to which the data protection function is applied. When the Locking SPs 124 are started up, they are allocated to the namespaces to which the data protection function is applied, in a one-to-one manner. The setting of the namespaces is executed by the FE unit 11. The allocation of the Locking SPs 124 to the namespaces is executed by the Admin SP 123. The allocation of the Locking SPs 124 to the namespaces by the Admin SP 123 will be described later. The allocation of the Locking SPs 124 to the namespaces means shifting the namespaces from a state in which the data protection function is not applied to a state in which the data protection function is applied. That is, the allocation of the Locking SPs 124 to the namespaces means that the data protection function is enabled for the name spaces.

The Admin SP 123 provides the Admin function. Specifically, the Admin SP 123 executes a lifecycle management of the Locking SPs 124, for example, activating (making active) or deactivating (making inactive) the Locking SPs 124. Activating the Locking SP 124 is to allocate the Locking SP 124 to a target namespace to which no Locking SP 124 is allocated, set the Locking SP 124 to an activated state, and enable the data protection function. On the other hand, deactivating the Locking SP 124 is to set the Locking SP 124 allocated to the target namespace to a deactivated state and disable the data protection function. Deactivation of the Locking SP 124 is also referred to as initialization. For example, activation of the Locking SP 124 returns a state of various PINs (personal identification numbers) for authenticating a user to an initial state. When the Locking SP 124 is deactivated, the allocation of the Locking SP 124 to the target namespace is invalidated. The Admin SP 123 also manages entire information of the TPer 12 such as a type of the SSC supported by the TPer 12 configured on the storage device 1. The type of SSC may vary depending on how the TPer 12 is configured. The entire information also includes the number of areas in the user area (hereafter referred to as "Ranges") that can be set in the entire storage device 1, the number of Ranges that can be set in each namespace, and the like, which will be described later.

The Admin SP 123 executes the lifecycle management of the Locking SPs 124 in response to a command from the host 2. As used herein, "Activate" is defined as a method for enabling the data protection function, and "Revert" and "RevertSP" are defined as methods for disabling the data protection function.

The Locking SPs 124 provide the Range function and the MBR shadowing function. The Range function is a function of dividing a user area into a plurality of areas. Specifically, the Range function is a function of setting an area referred to as Range on the user area. Range is sometimes referred to as a "Band". The Locking SPs 124 can manage the encryption key, set a restriction on read/write, and collectively invalidate data for each Range. As described above, the collective invalidation of data can be implemented by updating the encryption key. The entire user area in a state in which no Range is set is treated as a "Global Range". A partial area within the user area that is in a state in which one or more Ranges are set is also treated as Global Range if no Range is set in that partial area.

The MBR shadowing function is a function of performing authentication referred to as, for example, a pre-boot authentication. Each Locking SP 124 constructs a byte table, which is referred to as an MBR table including an authentication program, outside the user area of the storage 30. When access to an MBR, which is stored in a head of the user area (for example, an area starting from LBA=0), is requested, the Locking SP 124 converts access destinations from the head of the user area up to a size of the MBR Table to an area in which the MBR Table including the authentication program is stored. Accordingly, the authentication program in the MBR Table is started in place of a boot program in the MBR. The authentication program, for example, requests a transfer of a PIN. When the transferred PIN matches a PIN stored in the MBR table, the authentication program determines that the authentication is successful. When the authentication is successful, the authentication program starts the boot program in the MBR. When the authentication fails, the authentication program issues a notification of the error.

Figures 3, 4:
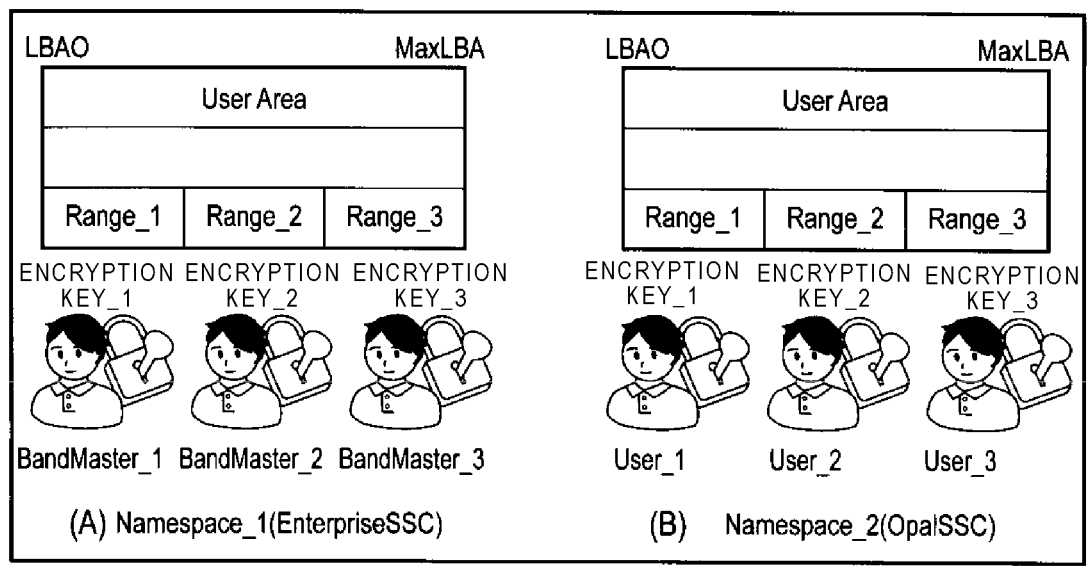
FIG. 3 is a diagram showing parameters to be added to extend an Activate method used by the storage device according to the first embodiment.
FIG. 4 is a diagram showing an example of a case in which Locking SPs of different SSCs are allocated on a per namespace basis in the storage device according to the first embodiment.

FIG. 3 is a diagram showing an example of parameters to be added to extend the Activate method, which is a standard method to enable the data protection function.

As shown in FIG. 3, the storage device 1 of the present embodiment, more specifically, the Admin SP 123 of the TPer 12 that operates on the storage device 1 can receive "Namespace ID", "SSC", and "Range Number" as parameters of the Activate method.

"Namespace ID" is a parameter for designating a namespace for the Activate method. When the Admin SP 123 receives the Activate method, the Admin SP 123 newly starts the Locking SP 124 and allocates the Locking SP 124 in the activated state. By newly establishing the "Namespace ID" parameter, the storage device 1 of the present embodiment can allocate the Locking SP 124 for each namespace. When the "Revert" or "RevertSP" method, which is a standard method used in a case of disabling the data protection function of a particular type (e.g., Opal or Enterprise), is issued, the Admin SP 123 deactivates all the activated Locking SP 124 allocated to all the namespaces to which the data protection function of the selected SSC type has been applied, and these namespaces are shifted to a state in which the data protection function is not applied.

"SSC" is a parameter that designates an SSC to be applied to the target namespace. Specifically, "SSC" is a parameter for designating Opal or Enterprise for each namespace. As described above, the type of SSC that is supported by the TPer 12 is managed by the Admin SP 123. The TPer 12 of the storage device 1 may support various SSCs such as Pyrite and Ruby in addition to Opal and Enterprise.

When Opal, for example, is designated in the SSC parameter, the Admin SP 123 configures the Locking SP 124 with the base template and the locking template necessary for executing the data protection processing compliant with the Opal specification. When Enterprise, for example, is designated, the Admin SP 123 configures the Locking SP 124 with the base template and the locking template necessary for executing the data protection processing compliant with the Enterprise specification. Differences exist between Opal and Enterprise. For example, the above-mentioned MBR shadowing function is necessary in Opal but not necessary in Enterprise; and an administrator authority (the user who has been authenticated using an Admin PIN) is able to release read/write restrictions on a Range (restrictions set by the user who has been authenticated using a user PIN and accesses the Range) in Opal, but an administrator authority (e.g., EraseMaster) is not able to release the read/write restrictions in Enterprise.

As described above, in CNL, one Locking SP corresponds to all namespaces to which the data protection function is applied. Accordingly, for example, it is not possible to apply Opal to a certain namespace and apply Enterprise to another namespace. In contrast, in the storage device 1 of the present embodiment, by the extension of the Activate method of adding the SSC parameter, it is possible to apply the SSC on a per namespace basis and thus, for example, it is possible to apply Opal to a certain namespace, and apply Enterprise to another name space.

When the Locking SP 124 has already been allocated to the namespace designated by the Namespace ID parameter, the Admin SP 123 does nothing but notifies the host 2 of the activation completion of the Locking SP 124.

Further, it is possible to perform switching from Opal to Enterprise on a namespace to which Opal is applied by, for example, issuing a Revert or RevertSP method to the namespace and issuing an Activate method designating Enterprise by the SSC parameter to the namespace.

The SSC parameter may be mandatory or optional. For example, Opal may be designated as a default when the SSC parameter is omitted.

"Range Number" is a parameter that designates the number of Ranges that can be set in the target namespace. The number of encryption keys available in the entire storage device 1 is determined according to the capacity of the storage 30 and the like. The remaining number of encryption keys decreases by one every time one Range is set in a namespace. Accordingly, due to the limitation of the number of available encryption keys, there may be an event that setting of a Range cannot be performed in another namespace when a large number of Ranges are set in a certain namespace. The encryption key is also consumed (i.e., assigned) at the time of setting the namespace. That is, one encryption key is consumed for the Global Range in a namespace, and encryption keys are consumed one by one for each Range that is not the Global Range (also referred to as "Non-Global Range") in the namespace. The timing for setting a Range on a namespace may be any timing and the timing for setting a namespace on the storage 30 may also be any timing.

The fact that the setting of Range in a certain name space influences the setting of Range in another name space means that independence of a namespace is not ensured. In the storage device 1 of the present embodiment, the number of Ranges that can be set can be designated on a per namespace basis (in order to ensure the number of Ranges at the time of setting the name space) by extending the Activate method by adding the Range Number parameter thereto. As a result, the independence of the namespace is ensured. When a number designated by the Range Number parameter of the Activate method issued for a certain name space is larger than the remaining number of the encryption keys, which is equal to: "the number of encryption keys available in the entire storage device 1" minus one (which is the number of Global Range that is set in the namespace) minus the number of Non-Global Ranges set in the namespace, the Admin SP 123 notifies the host 2 of an error. The Admin SP 123 manages the number of encryption keys available in the entire storage device 1 and the number of Ranges that can be set in each name space.

When the Locking SP 124 is deactivated, the number of ranges set to the Locking SP 124 by the Range Number parameter of the Activate method is reset. Thus, when issuing the Activate method to the Locking SP 124 again after it is deactivated, the Admin SP 123 does not need to consider whether the Range Number parameter of the current Activate method matches the Range Number parameter of a previous Activate method.

Similar to the SSC parameter, the Range Number parameter may be optional. When the Range Number parameter is not specified, a predetermined number, for example, 8, may be designated.

FIG. 4 is a diagram showing an example of a case where the Locking SPs 124 of different SSCs are allocated on a per namespace basis by the Activate method extended as above.

FIG. 4 shows an example in which Enterprise is applied to a certain namespace (Namespace_1) and Opal is applied to another namespace (Namespace_2). Three Ranges (Range_1, Range_2, and Range_3) are set for each of the Namespace_1 and the Namespace_2. Also, in the Namespace_1 to which Enterprise is applied, encryption keys for encrypting data in the Ranges are set by administrators of the Ranges (BandMaster_1, BandMaster_2, and BandMaster_3). On the other hand, in the Namespace_2 to which Opal is applied, encryption keys for encrypting data in the Ranges are set by users of the Ranges (User_1, User_2, and User_3).

Figure 5:
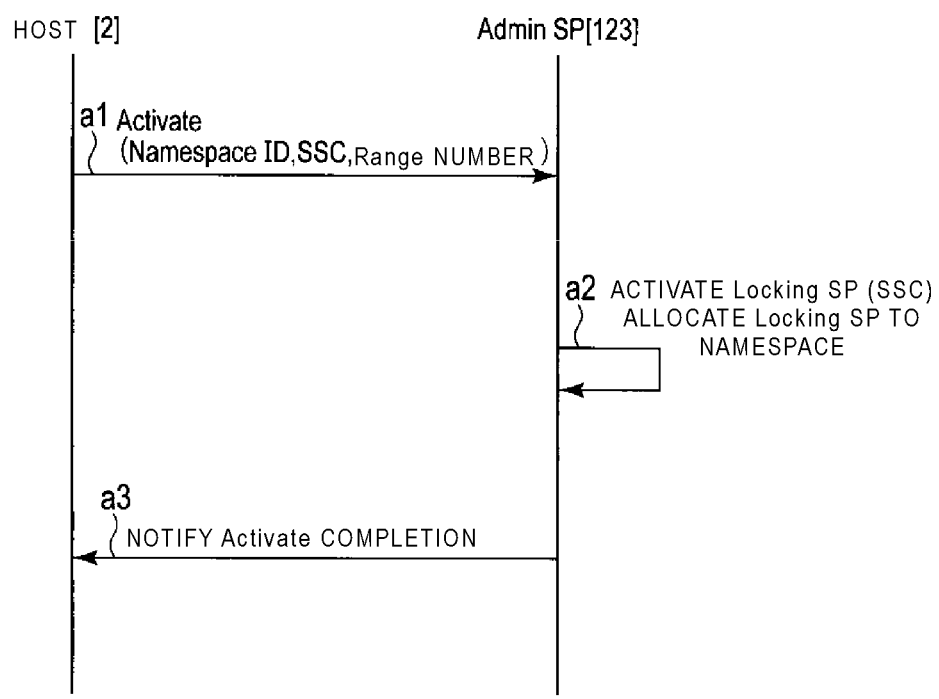
FIG. 5 is a sequence diagram showing a flow of steps carried out in the storage device according to the first embodiment when an Activate method is issued.

FIG. 5 is a sequence diagram showing a flow of the allocation of the Locking SP 124 to a namespace in the storage device 1 according to the present embodiment.

The host 2 issues an Activate method that includes the Namespace ID parameter, the SSC parameter, and the Range Number parameter (a1). The Admin SP 123 activates the Locking SP 124 for the SSC designated by the SSC parameter, and allocates it to the namespace designated by the Namespace ID parameter (a2). At this time, the Admin SP 123 also sets the number of Ranges that can be set based on the Range Number parameter.

After allocating the Locking SP 124 to the namespace designated by the Namespace ID parameter, the Admin SP 123 notifies the host 2 of the activation completion of the Locking SP 124 (a3).

Accordingly, the storage device 1 of the present embodiment makes it possible to apply each SSC to each namespace by using the extended Activate method to which the parameters are added and thereby convenience of the data protection function can be improved.

Here, the Namespace ID, the SSC, and the Range Number are examples of parameters to be added for the extension of the Activate method. In other embodiments, various parameters may be added without limitation. For example, the size of the MBR Table configured outside the user area of the storage 30 may be designated as one of the parameters of the Activate method.

As described above, the timing of setting a namespace on the storage 30 may be any timing. Similarly, deletion of a namespace may also generally be performed at any timing. Alternatively, the storage device 1 of the present embodiment may permit deletion of a namespace only when the Locking SP 124 is not allocated thereto.

Figure 6:
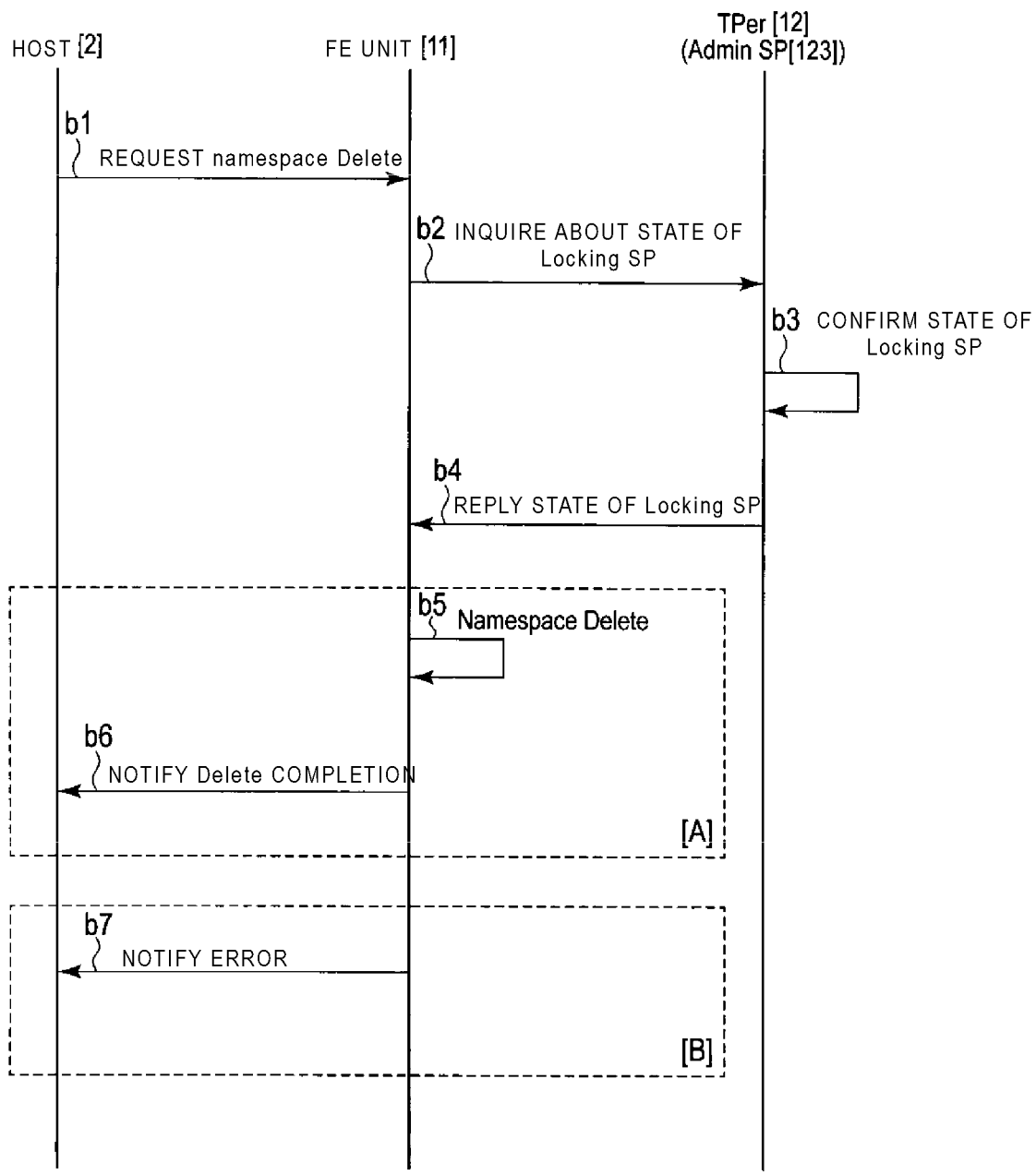
FIG. 6 is a sequence diagram showing a flow of steps carried out in the storage device according to the first embodiment when a namespace delete command is issued.

FIG. 6 is a sequence diagram showing a flow of deletion or deletion rejection of a namespace in the storage device 1 according to the present embodiment.

When the host 2 requests deletion (Delete) of a certain namespace (b1), the FE unit 11 queries the TPer 12, more specifically, the Admin SP 123, about the state of the Locking SP 124 related to the namespace (b2). The Admin SP 123 confirms the state of the Locking SP 124, for example, whether the Locking SP 124 is allocated to the namespace (b3). Also, the Admin SP 123 replies to the FE unit 11 the confirmation result about the state of the Locking SP 124 related to the namespace (b4).

When the Locking SP 124 is not allocated (as shown in dashed box [A]), the FE unit 11 deletes the namespace (b5), and notifies the host 2 of the delete completion (b6). On the other hand, when the Locking SP 124 is allocated and in the active state (as shown in dashed box [B]), the FE unit 11 rejects the deletion of the namespace and notifies the host 2 of an error (b7).

Accordingly, the storage device 1 of the present embodiment can delete a namespace only when the Locking SP 124 is not allocated.

Figure 7:
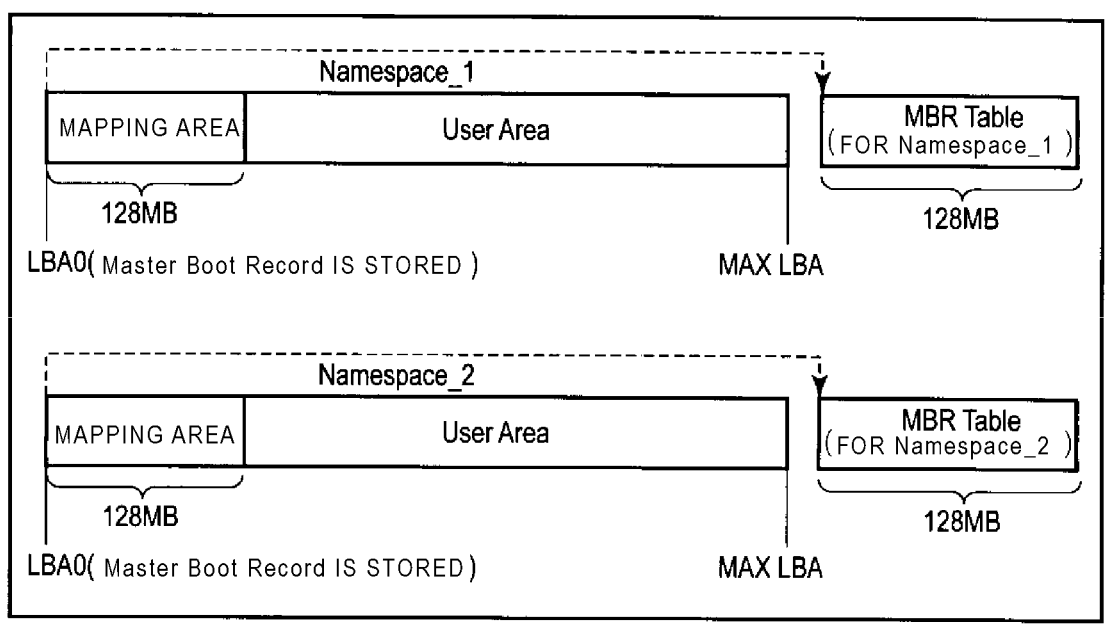
FIG. 7 is a diagram showing an example in which an MBR Table is configured separately for each of two namespaces in the storage device according to the first embodiment.

As described above, the Locking SP 124 provides the MBR shadowing function. For example, when Opal, in which the MBR shadowing function is mandatory, is applied in a plurality of namespaces, the plurality of Locking SPs 124 allocated thereto in a one-to-one manner will each configure an MBR Table described above. FIG. 7 shows an example in which an MBR Table is constructed in each of two namespaces (Namespace_1 and Namespace_2).

Assuming that a size of an MBR Table to be mapped to an area in which the MBR is stored is 128 megabytes (MB), 128 MB×2=256 MB are consumed for the MBR shadowing function. The value is increased by 128 MB each time the number of namespaces to which Opal, in which the MBR shadowing function is mandatory, is applied increases by one, for example. On the other hand, a plurality of MBR tables may be the same and shared depending on an application of the storage device 1.

Figure 8:
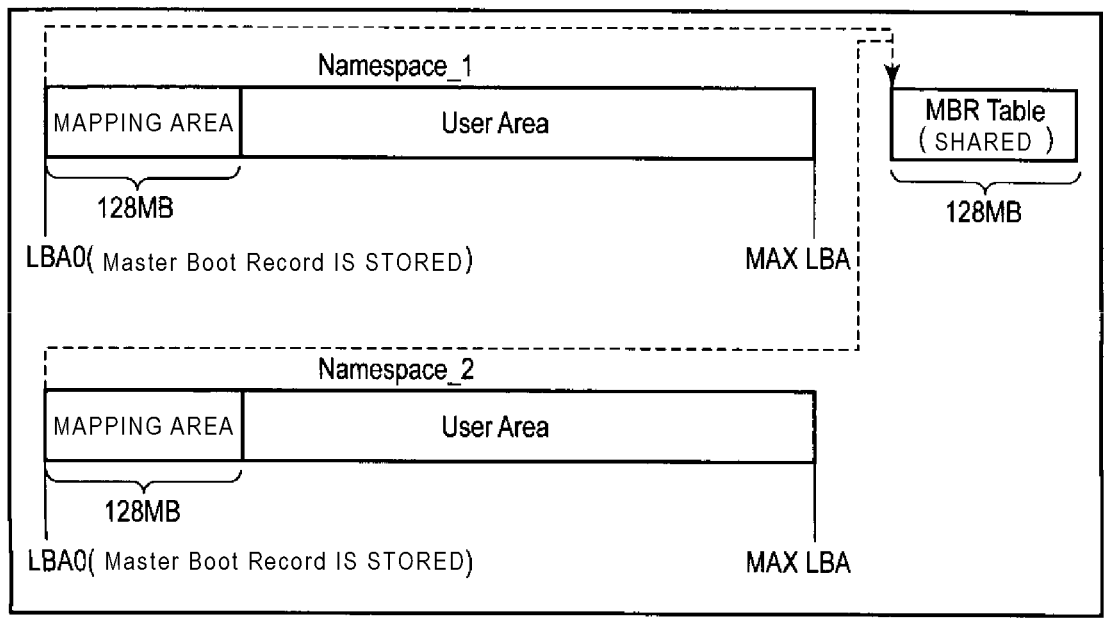
FIG. 8 is a diagram showing an example in which one MBR Table is shared between two namespaces in the storage device according to the first embodiment.

Thus, in the storage device 1 according to the present embodiment, for example, when Opal, in which the MBR shadowing function is mandatory, is applied to a plurality of namespaces, the plurality of Locking SPs 124 allocated thereto in a one-to-one manner may share one MBR Table, as shown in FIG. 8. For example, when Opal is first applied to a certain namespace with the SSC parameter, the Admin SP 123 instructs the Locking SP 124 to be allocated to the namespace to configure an MBR Table. After that, when Opal is applied to another namespace with the SSC parameter, the MBR Table that has already been configured can be shared by notifying the Locking SP 124 to be allocated to said another namespace, of a location of the MBR Table on the storage 30. Accordingly, excessive consumption of the storage 30 related to the data protection function can be prevented.

As described above, the Admin SP 123 manages the type of the SSC as part of the entire information of the TPer 12. The storage device 1 of the present embodiment may further report the type of SSC to be managed as a support function related to data protection, for example, in response to a request from the host 2. Not only the type of the SSC but also the number of encryption keys available in the entire storage device 1, the number of Ranges that can be set in each namespace, and a total value of the number of Ranges that can be set in each namespace managed as the entire information of the TPer 12 may be reported together.

Figure 9:
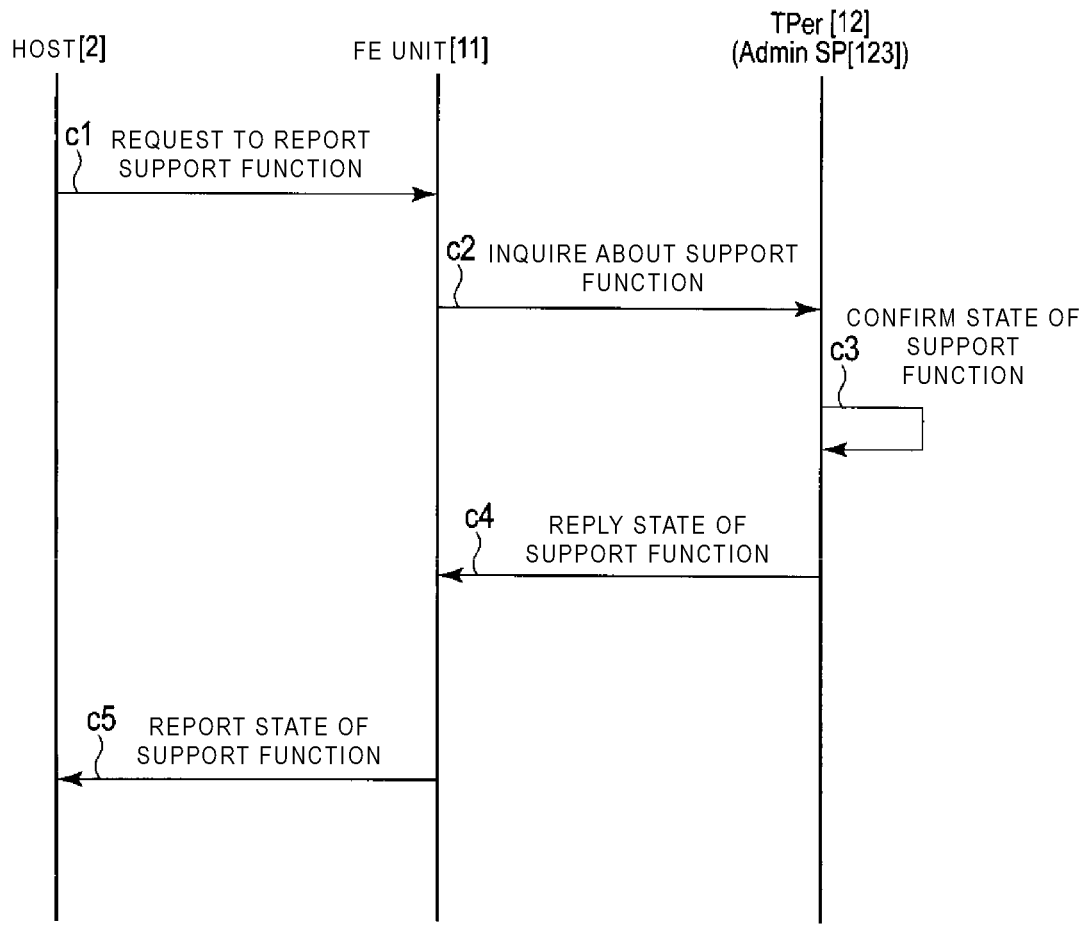
FIG. 9 is a sequence diagram showing a flow of steps carried out in the storage device according to the first embodiment when a request to report a support function is issued.

FIG. 9 is a sequence diagram showing a flow of a report of the support function in the storage device 1 according to the present embodiment.

The host 2 requests the storage device 1 to report the support function related to data protection by issuing a predetermined command (c1). Upon receiving the request, the FE unit 11 queries the TPer 12, more specifically, the Admin SP 123, about the support function (c2). Upon receiving the query, the Admin SP 123 confirms the entire information of the TPer 12 (c3), and replies to the FE unit 11 with the type of the SSC, the number of available encryption keys in the entire storage device 1, the number of Ranges that can be set in each namespace, and the total value of the number of Ranges that can be set in each namespace (c4). The FE unit 11 reports the support function related to data protection to the host 2 based on the information received from the Admin SP 123 (c5).

As a result, the host 2 can acquire the information about the support function related to data protection provided in the storage device 1 at any timing.

As described above, the storage device 1 of the present embodiment can improve the convenience of the data protection function.

Second Embodiment

Next, a second embodiment will be described.

Figure 10:
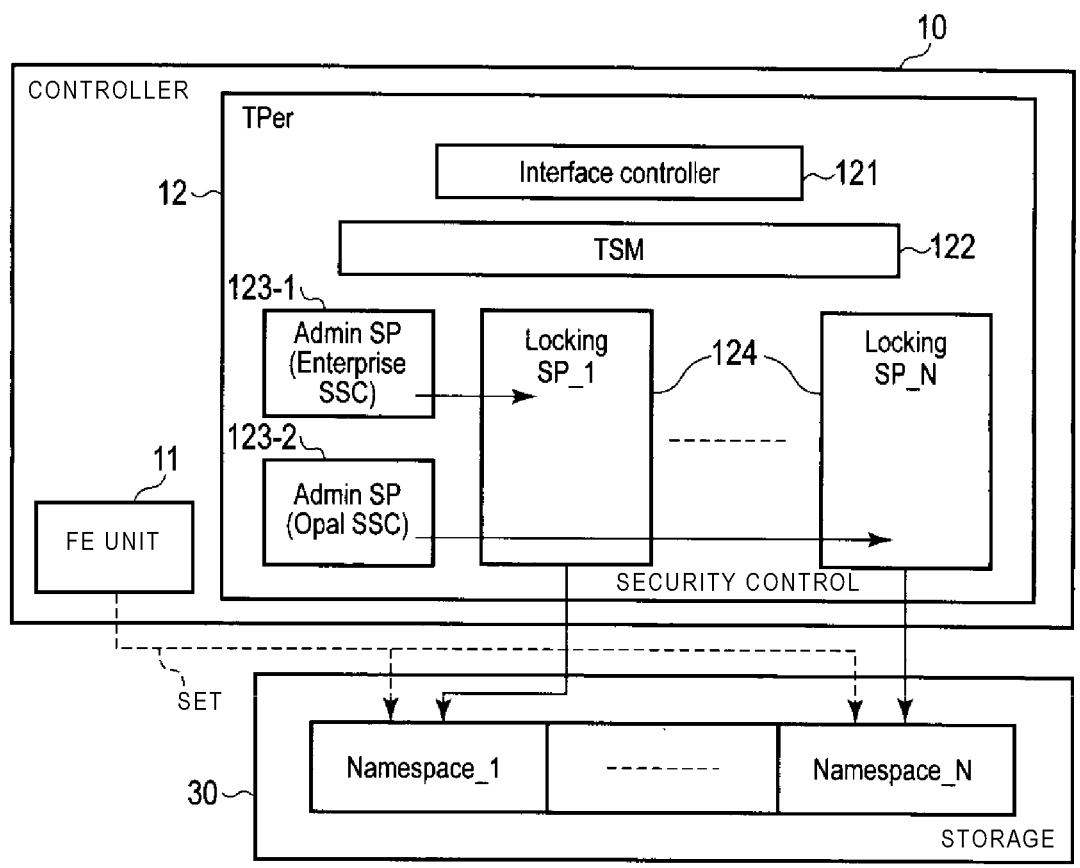
FIG. 10 is a diagram showing a configuration example of a storage device according to a second embodiment.

FIG. 10 is a diagram showing a configuration example of the storage device 1 according to the second embodiment.

In the first embodiment, one Admin SP 123 performs lifecycle management of all Locking SPs 124 including, for example, a Locking SP 124 corresponding to Enterprise and a Locking SP 124 corresponding to Opal. In contrast, in the storage device 1 according to the present embodiment, the Admin SP 123 is provided for each SSC supported by the TPer 12, and the Admin SP 123 for each SSC executes the lifecycle management of the Locking SP 124 corresponding to each SSC. FIG. 10 is a diagram showing a configuration example of the TPer 12 in the storage device 1 according to the second embodiment.

Here, it is assumed that the TPer 12 constructed in the controller 10 mounted on the storage device 1 according to the present embodiment supports two types of SSCs of Enterprise and Opal. Therefore, two Admin SPs 123 of an Admin SP 123-1 for Enterprise and an Admin SP 123-2 for Opal exists in the controller.

When Enterprise is designated by an SSC parameter of the Activate method, the Admin SP 123-1 for Enterprise activates the Locking SP 124 corresponding to Enterprise and allocates it to a namespace designated by a Namespace ID parameter. When Opal is designated by an SSC parameter, the Admin SP 123-2 for Opal activates the Locking SP 124 corresponding to Opal and allocates it to a namespace designated by a Namespace ID parameter. FIG. 10 shows a state where the Admin SP 123-1 for Enterprise allocates the Locking SP 124 corresponding to Enterprise to the Namespace_1, and the Admin SP 123-2 for Opal allocates the Locking SP 124 corresponding to Opal to a Namespace_N.

In the storage device 1 of the second embodiment, all the Admin SPs 123 share the entire information of the TPer 12. Thus, similarly to the first embodiment, the number of Ranges can be ensured at the time of setting a namespace by the Range Number parameter in the Activate method.

The Admin SP 123-1 deactivates the activated Locking SP 124 corresponding to Enterprise when the Revert or RevertSP method is issued to the Admin SP 123-1 for Enterprise. The Admin SP 123-2 deactivates the activated Locking SP 124 corresponding to Opal when the Revert or RevertSP method is issued to the Admin SP 123-2 for Opal.

By providing the same number of Admin SPs 123 as the number of types of the SSCs supported by the TPer 12, in addition to load distribution, for example, the data protection function only for a namespace to which Enterprise is applied can be disabled, or the data protection function only for a namespace to which Opal is applied can be disabled. That is, independence of the SSC can be ensured.

The storage device 1 may prepare parameters for deactivating all SSCs as parameters of the Revert or RevertSP method. For example, by newly adding a "RevertTPer" parameter to the Revert or RevertSP method and by issuing the method with a true value for the parameter, all SSCs may be deactivated. In this case, it is preferable to set such a condition for permitting designation of the RevertTPer parameter that the authentication is successful using a high-level authority PIN (e.g., an owner PIN, a PSID (physical secure ID) PIN, or the like).

As described above, in the storage device 1 of the present embodiment, the convenience of the data protection function can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
    a nonvolatile storage in which a plurality of namespaces is set, each of the namespaces being assigned with a certain logical address range; and
    a controller configured to:
        in response to a first command to activate a first namespace included in the plurality of namespaces, apply, selectively to the first namespace, a first data protection processing method compliant with a first storage specification of a Security Subsystem Class (SSC), which defines a first manner of assigning encryption keys, performing a pre-boot authentication, and performing read and write restrictions, in accordance with a first parameter in the first command that indicates the first namespace; and in response to a second command to activate a second namespace included in the plurality of namespaces, apply, selectively to the second namespace, a second data protection processing method compliant with a second storage specification of the SSC, which defines a second manner of assigning encryption keys, performing the pre-boot authentication, and performing read and write restrictions, in accordance with a second parameter in the second command that indicates the second namespace, the second storage specification being different from the first storage specification, wherein the controller is capable of making the first and second data protecting processing methods concurrently applied to the first and second namespaces, respectively.

2. The storage device according to claim 1, wherein the controller includes a security control circuit, which includes at least one first data protection processing unit configured to execute the first data protection processing method, and a second data protection processing unit configured to execute the second data protection processing method, and the security control circuit is configured to allocate the first data protection processing unit to the first namespace and the second data protection processing unit to the second namespace.

3. The storage device according to claim 2, wherein in response to a delete command to delete a namespace from the plurality of namespaces, the security control circuit deletes the namespace if neither the first data protection processing unit nor the second data protection processing unit is allocated thereto, and does not delete the namespace if one of the first data protection processing unit and the second data protection processing unit is allocated thereto.

4. The storage device according to claim 3, wherein the security control circuit further includes a management unit configured to execute lifecycle management on the first data protection processing unit and the second data protection processing unit, the lifecycle management including activating and deactivating the first data protection processing unit and the second data protection processing unit.

5. The storage device according to claim 4, wherein in response to a command to activate the first or second data protection processing unit for a namespace of the plurality of namespaces, the management unit sets a number of divisible areas in the namespace according to a parameter specified in the command.

6. The storage device according to claim 3, wherein the security control circuit further includes a first management unit configured to execute lifecycle management on the first data protection processing unit including activating and deactivating the first data protection processing unit, and a second management unit configured to execute lifecycle management on the second data protection processing unit including activating and deactivating the second data protection processing unit.

7. The storage device according to claim 6, wherein in response to a first command to activate the at least one first data protection processing unit for a namespace of the plurality of namespaces, the first management unit sets a number of divisible areas in the namespace according to a parameter specified in the first command, and in response to a second command to activate the second data protection processing unit for a namespace of the plurality of namespaces, the second management unit sets a number of divisible areas in the namespace according to a parameter specified in the second command.

8. The storage device according to claim 6, wherein in response to a deactivation command, at least one of the first management unit and the second management unit deactivates both the first data protection processing unit and the second data protection processing unit.

9. The storage device according to claim 2, wherein the at least one first data protection processing unit comprises a plurality of first data protection processing units, the plurality of first data protection processing units are respectively allocated to different namespaces of the plurality of namespaces and share an authentication program configured to authenticate a user when an access to a Master Boot Record (MBR) is requested.

10. The storage device according to claim 2, wherein the controller reports a function provided by the security control circuit to the host.

11. The storage device according to claim 1, wherein the nonvolatile storage is a Solid State Drive (SSD).

12. The storage device according to claim 1, wherein the first storage specification is one of Opal, Enterprise, Pyrite, and Ruby, and the second storage specification is another one of Opal, Enterprise, Pyrite, and Ruby.

* * * * *